Jan. 6, 1942.　　　　E. G. BAILEY　　　　2,268,558
FURNACE CONSTRUCTION
Filed June 16, 1938　　　2 Sheets-Sheet 1

INVENTOR.
Ervin G. Bailey
BY
ATTORNEY.

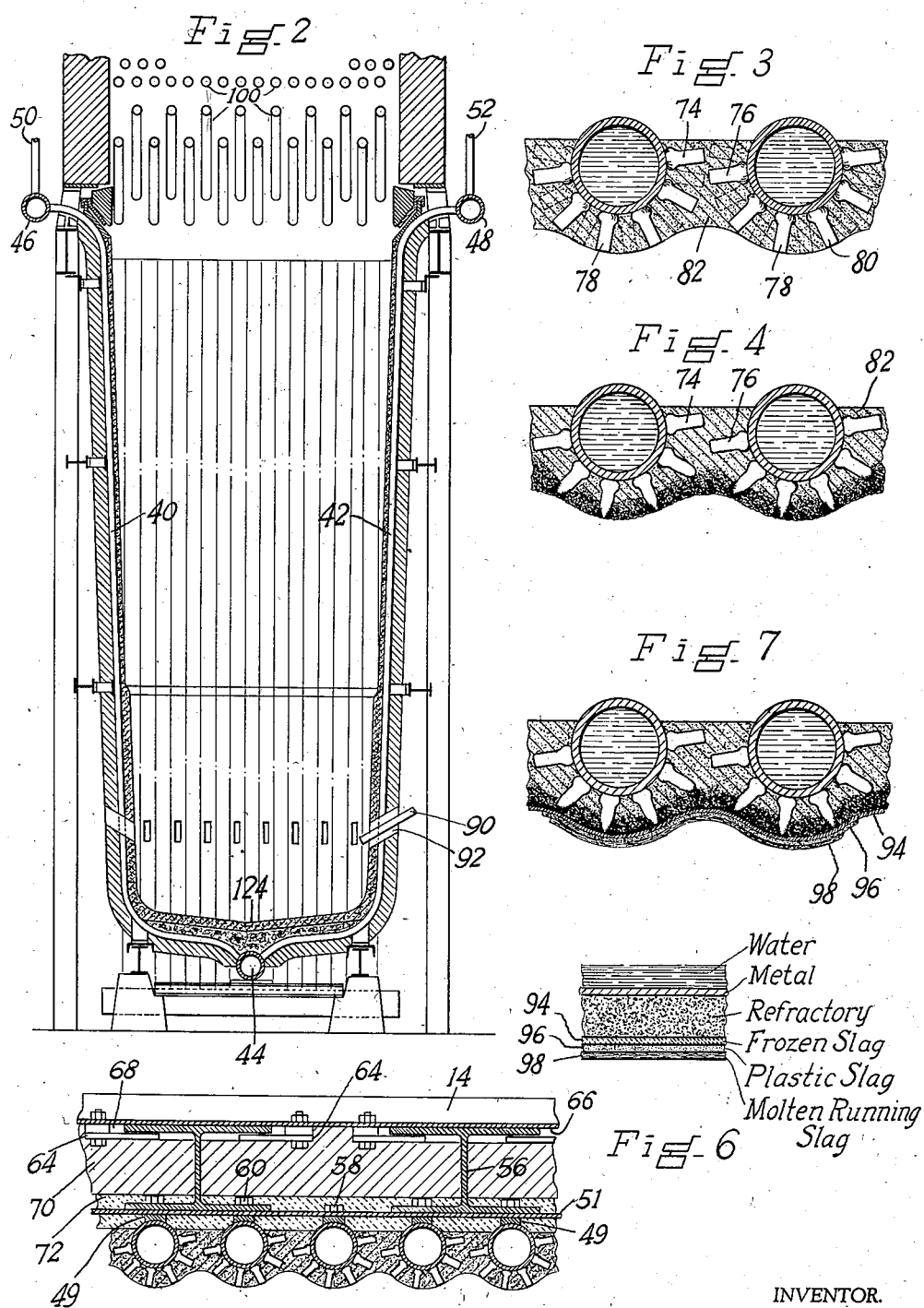

Patented Jan. 6, 1942

2,268,558

UNITED STATES PATENT OFFICE 2,268,558

FURNACE CONSTRUCTION

Ervin G. Bailey, Easton, Pa., assignor to The Babcock & Wilcox Company, Newark, N. J., a corporation of New Jersey Application June 16, 1938, Serial No. 214,001

7 Claims. (Cl. 122—6)

In furnaces, and specifically steam boiler furnaces, it is economically desirable to burn the required amount of fuel with a minimum of excess air in the smallest possible furnace having walls which will withstand the severe conditions imposed without excessive maintenance. These conditions naturally result in high furnace operating temperatures in a furnace of given size, and other things being equal, temperatures are higher in large furnaces.

In some furnaces, the enclosing walls are constructed wholly of non-metallic refractory materials having softening and fusion temperatures which are higher than furnace operating temperatures. However, the problem of furnace construction and the materials used therefor is not limited to temperature alone, as with some fuels, particularly pulverized coal, the non-combustible material in the fuel or ash, when at the elevated temperature existing in the furnace, tends to react chemically with the refractory of the furnace construction which is also at the elevated furnace temperature. Such reactions result in the formation of eutectics or the like, having melting points lower than any one of the constituent ingredients. It is obvious, therefore, that the operation of such furnaces must be limited to temperatures below those at which these chemical reactions will take place in order to avoid excessive furnace wall maintenance, and this necessarily results in the modification of one or more of the conditions for economical and efficient construction and operation of the furnace.

In some steam boiler furnaces the walls are largely if not wholly metallic, these metallic walls being cooled by the water of the boiler circuits. These water-cooled walls are formed by rows of steel tubes, arranged in wall alignment, and in some cases they may be contiguous. When the water tubes are spaced apart, metallic side extensions may be arranged to close the spaces between them, or the spaces between the tubes may be closed by metallic blocks. Such water-cooled metallic furnace walls resist destruction indefinitely so long as the cooling is adequate, and this is true regardless of the temperatures of the furnace and compositions of the gaseous and incombustible constituents of the fuels. These constructions are, however, not universally acceptable because they may lower the furnace temperatures excessively by the absorption of heat by the walls. Furnace temperatures may be too low for stability of flames or for good combustion, especially in small furnaces. These metallic faced water walls may not be acceptable for other reasons, for example, in billet heating furnaces, bare water-cooled parts absorb more heat than is desirable, thus making it unduly costly to maintain the high temperatures required in the furnace for delivery of steel billets or the like at temperatures necessary for forging or rolling. At the other extreme of operating conditions in these water-cooled metallic surface furnaces, there are occasions when the intensity of heat application to a localized section of water-cooled surface is so severe for the necessary metal thickness as to result in damage to the metal and possibility of rendering the unit inoperative. Any of these undesirable conditions inevitably result in some modification to the most economical and efficient construction and operation of the furnace.

The above indicated limitations of furnace walls made entirely of ceramic refractory material, and also those of the opposite type of wall constructed entirely of water-cooled metal, have been recognized, and as a result, a third class of wall construction has been utilized which can be designated as composite, employing water-cooled metallic parts and non-metallic refractory materials associated in considerable variety. These composite constructions have been intended to provide adequate resistance to destruction, on the one hand, and, a suitable limitation of heat absorbing capacity on the other hand, to the end that the desired furnace temperatures might be attained in furnaces of different sizes, and in furnaces employing different fuels. It has been suggested that such composite walls include spaced metallic water tubes exposed directly to the furnace gases and associated with ceramic refractory material back of the tubes, or with the ceramic refractory material filling the intertube spaces and extending toward the furnace. In other cases it has been suggested that the water tubes be entirely covered with a ceramic refractory facing extending between the tubes and over the furnace sides of the tubes to a specified thickness.

Of the composite furnace wall constructions, employing both steel tubes and ceramic refractory materials, one type has proven to be most satisfactory as to resistance to destruction under severe operating conditions, furnace temperature control through wall heat absorption adjustment, cost, and such adaptability as to shape and location that it lends itself readily to advantageous use in the construction of side walls, roofs, floors, arches, baffles, slag screens, and other furnace components. This most desirable water wall type has metallic extensions welded to the tubes along their intertube sides and, in some cases, also over their sides or faces presented toward the furnace. It also includes a plastic ceramic refractory material applied over the tube surfaces and between the metallic extensions. The extensions of the water tubes conduct heat from the refractory material and maintain a temperature gradient from the tube wall outwardly to the wall face exposed directly to the furnace gases, any particular such temperature gradient being determined by the spacing, length, and thickness of the extensions. In one of its forms, this type of wall includes extensions in the form of steel or alloy studs of round section, secured radially with respect to the tubes and hence arranged so that they diverge outwardly toward the furnace face.

The successful use of this most desirable form of composite refractory and steel tube construction applicable to furnace walls requires some means to hold the refractory material in its operative position after shrinkage, or after the formation of cracks in the material. One factor that influences the displacement of the furnace wall refractory is a layer of slag resulting from the incombustible in the fuel adhering to the furnace face and sticky or semi-plastic when hot, but shrinking and exerting a warping or pulling force on the refractory when it cools. Such a displacement of the ceramic refractory is essentially that of mechanical removal. The ash forming the incombustible portion of a fuel such as coal has a melting point that naturally varies with its specific chemical composition and consequently the ash from different kinds of coal varies in melting temperatures over a relatively wide range. The ceramic refractory material must be of such chemical composition that at the temperature of the exposed face, there will be no detrimental chemical reaction between the ash even when it is molten, and the refractory material at its reduced temperature resulting from its proximity to the fluid cooled tubes. In addition, there must be some means of bonding the refractory to the studded metal structure that will also resist the effect of repeated heating and cooling of the wall.

My invention involves a new combination of materials for the above indicated type of composite wall construction, and it also involves a method of bonding these materials to produce a composite wall of fluid cooled metal with a refractory face that meets service requirements including that of preventing physical or mechanical detachment as well as chemical erosion or removal of the refractory beyond an equilibrium thickness during the operation of the furnace. For the metal parts of the composite wall, I preferably employ ferrous metals which may be cast iron, wrought iron, cast or forged carbon or alloy steel, according to the shape and pressure requirements of the cooling fluid within the metallic parts. I also preferably employ a ferrous metal for the welded extensions of the outer surfaces.

For the ceramic refractory, I preferably employ a chrome ore composition prepared or processed so as to form a stiff plastic for application to the face of the cooled ferrous metal and around the metallic extensions of its surface. The chromite of this composition is a spinel and part of the iron and chromic oxide can be replaced by either silica or alumina so that the mineral may vary widely in analysis but maintain its distinctive refractory properties. In all of its various compositions it contains a substantial amount of iron and it is not only highly refractory, but it is essentially neutral in chemical composition and resists chemical combination with combustion products including molten ash. It is consequently serviceable to a high degree, and of long life. The chrome ore refractory composition includes material such as water-glass to give it sufficient plasticity for the purpose of installation and the required initial "air setting."

My method of bonding the plastic refractory to the metal involves the heating of the furnace face of the refractory material after the application of the plastic to the tubes. When the construction is being employed in a furnace in which a fuel is being burned at such a rate to insure such a high temperature being obtained in actual operation, this heating can be accomplished during the early stages of normal operation of the furnace. In other furnaces, however, where the fuel being burned and the general combustion conditions will not result in the required high temperature for bonding during normal operation—as for example furnaces in which waste liquor from the sulphate pulp making process known as "black liquor" is being burned—this bonding is accomplished by heating the furnace to the desired temperature by means of a supplemental fuel, such as oil, prior to normal operation of the furnace, or by local application of heat to successive wall areas to accomplish the same effect. Oil or natural gas are desirable fuels for this purpose in view of the low ash content of the former fuel and the absence of ash in the latter fuel, this being desirable in view of the possible chemical actions between the molten ash and the hot refractory previously referred to. When the furnace face of the wall is heated to a sufficiently high temperature, the refractory composition becomes permanently bonded to the metal extensions on the water-cooled tubes. The bonding, therefore, is a temperature effect at the junction of the chrome ore refractory composition and the ferrous oxide which is naturally adherent to ferrous metal, and this occurs where the temperature has been high enough to bring about some oxidation at the surface of the metal and the sintering of this oxide with the chrome ore. This zone of sufficiently high temperature is limited by the cooling action on the ferrous metal extensions by conduction to cooling fluid within the tubes integral with those extensions.

Uncooled or insufficiently cooled ferrous metal exposed to furnace gases which normally are oxidizing due to excess air supplied with the fuel will oxidize or "burn" in service. This may also occur when the ferrous metal surfaces are not exposed but are covered with the refractory composition through which the gases may diffuse, shrinkage cracks in the refractory material also providing for the exposure of the metal surfaces. The degree and rate of oxidation of the metal surfaces varies with the temperature to which the metal is raised, and at the high temperatures employed in my process the ends of the metallic extensions furthest away from the cooling action of the fluid in the tubes with which the extensions are integral, which ends are naturally at the highest metal temperatures, are oxidized extensively, sometimes shortening the metallic extensions by 20 to 40% of their original lengths from the surface of the tubes to which they are welded.

The chrome ore refractory composition employed in the practice of this invention possesses refractory properties which are not impaired by contact of the composition with iron oxide and this is true even when the oxide is molten. The oxide cannot be in a molten condition at certain distances inwardly from the furnace face of the refractory because of the cooling actions of the metallic extensions, and yet it may be present in the solid form not yet melted, or in the solid form due to freezing of oxide which has previously been melted.

Although the invention as above indicated is especially adapted for use in boiler walls, it presents composite refractory structures which are advantageous in other uses because of its durability and low cost.

The invention will be described with reference to preferred embodiments which are illustrated in the accompanying drawings, in which:

Fig. 2 is a vertical section of the Fig. 1 construction taken at right angles to the plane along which Fig. 1 is taken;

Fig. 3 is a detail view showing adjacent tubes of the furnace wall and illustrating the condition of the furnace wall with the plastic chrome refractory applied to the water tubes and the tube extensions prior to the heating of the composite structure;

Fig. 4 is a horizontal section similar to Fig. 3 but illustrating the condition of a furnace wall after the heating of the structure in accordance with my invention to provide for the bonding of the composite structure;

Fig. 5 is a horizontal section through a portion of the furnace wall, showing the heat insulating material and the tube supports which maintain the tubes in wall alignment;

Fig. 6 is a diagrammatic view indicating the condition of the completed furnace wall under certain operating conditions.

Fig. 7 is a detail horizontal section showing a portion of the furnace wall having the structure indicated in Fig. 6.

Figure 1:
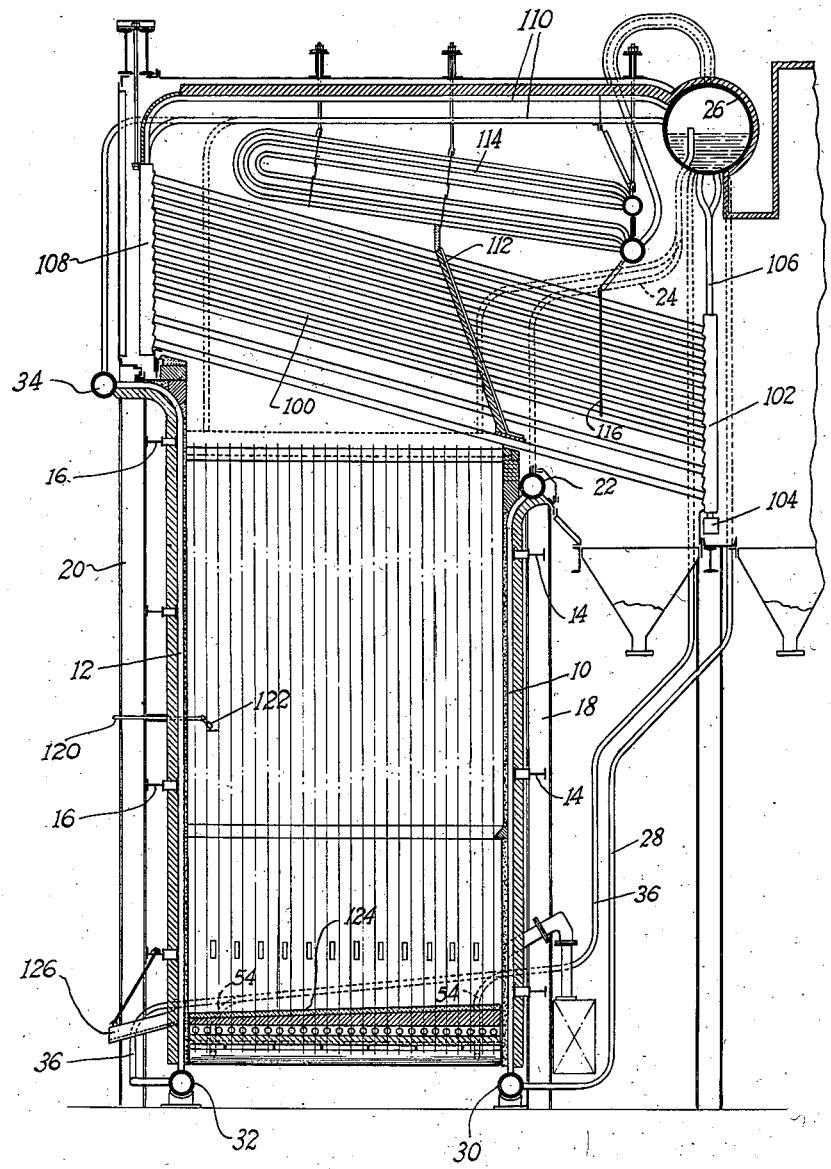
Fig. 1 shows a vertical section of a furnace in which the invention is employed.

In the drawings, Fig. 1 indicates a chemical and heat recovery unit in the furnace of which one embodiment of my invention is employed. There is burned in this furnace a waste fuel obtained from the sulphate pulp making process known as "black liquor" and the furnace gases are utilized to generate steam in a water tube steam boiler.

The furnace walls shown in vertical section in Fig. 1 are defined by rows of spaced tubes 10 and 12 which are maintained in wall forming alignment by securement to horizontal buckstays 14 and 16. The latter are in turn supported by the boiler setting columns 18 and 20.

The tubes 10 are connected at their upper ends with the header 22 from which the risers 24 extend to the steam space of the separator drum 26. The fluid circuit through the wall tubes is completed by the downtakes 28 which connect the lower header 30 with the water space of the drum 26. A similar arrangement of headers 32 and 34 and circulators 36 complete a fluid circuit through the wall tubes 12.

The remaining furnace walls, shown in Fig. 2, are defined by the rows of spaced tubes 40 and 42 connected at their lower ends to a floor header 44 and at their upper ends to the opposite headers 46 and 48. Risers 50 and 52 connect the latter to the steam space of the drum 26, and downtake circulators 54 establish communication between the water space of the drum 26 and the header 44 to complete the wall cooling circuits through the opposite sets of wall tubes 40 and 42.

Fig. 5 illustrates the means by which the wall tubes are held in their operative positions. Each tube is provided with vertically spaced lugs 49 welded to the tube and located adjacent the horizontal buckstays 14. Horizontal tie-bars 51 contact with the lugs of several successive tubes and are provided with apertures aligning with internally screw-threaded sockets in the lugs. Similarly spaced openings in the flanges 53 of the H-beam sections 56 also register with some of the sockets. Cap-screws 58 and 60 pass through these elements to rigidly secure the tubes in alignment and the H-beam sections are held against the buckstays 14 by the clips 62 and 64. The latter cooperate with the inner flanges 66 of the buckstays to form guideways 68 permitting the tubes to have limited movements with respect to the boiler setting framework.

Sheet metal casing sections may extend between the buckstays and be secured thereto to form a furnace encasement to assist in holding the heat insulating layers 70 and 72 in the positions indicated. The material of the layer 72 is of such character that it may be installed as a plastic or semi-plastic around the tie-bars 51 and over the colder sides of the wall tubes, while the layers 70 may consist of preformed blocks or slabs of comparatively low density heat insulation material.

Forwardly of the heat insulation layer 72 the tubes have metallic extensions welded thereto. They are shown in Figs. 3, 4, 5 and 7 as round section studs preferably extending radially from the tubes and provided with heads at their ends adjacent the tubes. These heads form shoulders which enhance the welding operation and the operative head transfer characteristics of the completed wall.

Although the inter-tube studs 74 and 76 are shown to be of the same length as the face studs 78 and 80, the relative lengths will depend upon several factors among which the temperature at which the furnace is to be operated is predominant. The material of the stratum 82 is highly refractory, and I preferably employ a chrome ore composition with which a liquid binder is incorporated to such an extent that the composition may be applied by ramming, tamping or the like against the tubes and around the metallic extensions or studs. The composition may "set" or air harden enough to retain it in place until it is heated and the steps of my invention are carried out. When rammed into place over the studs and tubes this composition assumes a form similar to that shown in Fig. 3. Its chemical constituency is such that undesirable chemical reactions with molten ash or slag of pulverized coal or other fuels are resisted. Furthermore, the refractory does not react with iron oxide formed on the studs to form a eutectic or compound of lower fusing temperature than the refractory itself, which is in the neighborhood of 3500 deg. Fahr. Instead the iron oxide retains its identity and penetrates the refractory (under the influence of heat) in a dendritic (or branched) formation to form a bond between the studs and the refractory. The iron oxide on the metallic extensions is formed by heating the composite structure to relatively high temperatures (with respect to the fluid cooled wall) in an atmosphere containing some oxygen, the combustion of the fuel being so regulated that there is a slight excess of air. The chrome refractory being applied to the structure for a thickness corresponding to the length of studs welded to the tubes, the ends of the studs are exposed to this high temperature oxidizing atmosphere and are therefore readily oxidized on the surface of their ends.

In the furnace illustrated in the drawings, the normal operating conditions (the furnace burns "black liquor", 50% $H_2O$, 22% ash, 28% combustible, 3500 B. t. u./# A. F.) are such as not to result in the high temperature necessary to procure the bonding of the composite structure. Consequently, a preburning operation utilizing a supplementary fuel is employed to insure the proper bonding. For this purpose, oil burners 90 are inserted through the primary air ducts 92. Several of these burners are first used on one side of the furnace for a considerable period of time and then a similar operation is carried on with the burners arranged at the opposite side of the furnace. In this manner, the surface of the composite wall structure can be subjected to high temperatures. In other furnaces, burning pulverized fuel, oil, or gas, the use of the burners provided for normal operation, is satisfactory for the purposes of this bonding operation. Normally the ends of the studs are exposed to furnace gases during this heating operation, and this condition permits the formation of iron oxide on the surface of the studs, which oxide may melt or sinter and diffuse into the refractory. Such a relationship of the studs and the refractory is clearly indicated in Figs. 3, 4, 5 and 7.

When considerable portions of iron oxide have been formed they become melted or sintered and extend into a matrix of the refractory material in dendritic formations. Thus, a mechanical bonding action occurs which holds the refractory to the iron oxide which, in turn, is bonded to the ferrous metal, the entire structure thus forming an integral wall.

Fig. 4 of the drawings represents the condition of the wall after the heating process, and this figure is intended to indicate the fact that the heating effect penetrates the wall much more deeply at positions between adjoining studs, the cooling action of the studs limiting this effect along their surfaces.

During the heating operation, shrinkage of the refractory 82 will result in the formation of small cracks or crevices which assist in the permeation of oxidizing gases to contact with the metallic extensions or studs and thus assist in the formation of iron oxide along the surfaces of the studs which in turn promotes an additional effect in bonding the metallic parts, the metallic oxide, and ceramic constituents of the composite wall structure.

In furnace constructions in which the fuel to be burned will, under normal operating conditions, result in furnace temperatures sufficiently high to result in the bonding of the metallic and ceramic refractory material, as for example with pulverized coal, subsequent operation will result in the adjustment of the length of the metallic extensions and depth of the layer of ceramic refractory, depending on actual operating conditions. For example, the studs welded to the water tube are, for ease of manufacture and cost reasons, of the same length. With a certain grade of coal having an ash with a high fusion temperature the initial operation to accomplish bonding might be such as to accomplish the heating operation with oxidation of the stud ends and the dendritic formation of iron oxide into the ceramic refractory matrix with little or no alteration in the thickness of the layer of refractory material and with the formation of a relatively thin layer of solidified "slag" thereon, the furnace face of this solidified layer being molten. Subsequent operation of the furnace with the same coal but at a reduced rate would naturally result in a decrease in furnace temperature which might, in turn, result in a thickening of the layer (94 and 96, Figs. 6 and 7) of solidified slag superimposed on the refractory surface to a point at which the surface temperature of the slag layer is sufficient to maintain it in molten condition (when the furnace temperature is high enough), or in other words, the same temperature conditions as those previously existing. The other extreme of operation with the same coal would be at a greater rate, under which conditions the slag layer would diminish and might eventually disappear entirely with molten slag running on the surface of the refractory of the wall structure, and the intensity of heat might be such as to result in the thickness of refractory itself being diminished, and the ends of the studs being oxidized to a point where they are diminished in length, before the equivalent equilibrium temperature on the wall surface is again reached. Thus, with the particular set of conditions under consideration the initial length of stud and corresponding thickness of refractory layer might be greater than that necessary for the maximum rate of operation of the furnace, and under these conditions the wall structure would automatically be reduced in thickness to that suited for maximum rate operation. Operation at any lower rate would result in the thickness of the wall being increased over this minimum by solidified slag accumulations. In this manner it will be seen that this composite structure is self adjusting, and by its very nature at all times reaches an equilibrium condition for the particular load at which the furnace is being operated at any one time. While what has been said refers specifically to temperature alone, it will be appreciated that analogous conditions will prevail for the chemical constituencies of the various ash compositions of fuels that might be encountered in different installations of essentially the same design, or in the same installation at different times.

It will also be appreciated however, that whenever the thickness of the refractory layer and length of studs are reduced due to such conditions the temperature effect on the composite structure beyond that which is being removed is essentially the same, and functions the same, as the original heating operation to accomplish this bonding. In other words, the formation of the oxide on the metallic extensions, and the dendritic permeation of the oxide into the matrix of ceramic refractory is accomplished in the vicinity of the minimum equilibrium thickness so that the "bonded" surface presented to the furnace at this equilibrium thickness is always essentially the same irrespective of what the minimum thickness, equilibrium temperature, chemical composition of ash, or rate of operation of the furnace might be.

The furnace and boiler installation shown in Fig. 1 of the drawings includes a bank of horizontally inclined steam generating tubes 100 connected at their upper ends to uptake 108 and at their lower ends to downtake 102. The lower ends of the downtake headers are connected to a lower cross header 104 and their upper ends are connected by the tubes 106 with the water space of the drum 26. The uptake headers 108 have their upper ends connected by the horizontal circulators 110 with the steam space of the drum 26. The furnace gases pass across the bank of tubes 100 and then into contact with the tubes of the superheater 114 which receives steam from the drum 26. In the particular steam generating installation shown, there are three gas passes across the bank of tubes 100, these gas spaces being separated by the intervening baffles 112 and 116.

Fig. 1 also shows a fuel line 120 leading to a spray burner 122 which is utilized during the normal operation of the furnace. During such operation, recovered chemicals are collected upon the hearth 124 and are drawn from the furnace through the spout 126.

It is understood that while I have found chrome ore to be a suitable refractory for use in my composite wall construction, my invention includes the use of other refractory of similar properties as to resistance to chemical attack of the slags or ash of solid fuels, and the oxide of iron, in the solid or molten state, and also as to refractoriness or resistance to damage due to temperature alone, and the property of bringing about a bonding of the slag (or refractory) to the metallic oxide, which oxide is bonded to the metallic extensions, and thereby holds the refractory tenaciously to the water cooled tubular structure.

I claim:

1. In a method of forming a furnace wall, providing fluid cooled tubular ferrous metal parts and securing them in such a position that they will be subject to the heat of the furnace, welding ferrous metal extensions to the tubes, processing a chemically neutral spinel composition with a plasticizer and cementing agent to form a stiff plastic, molding said stiff plastic spinel composition around the extensions and over surfaces of the tubes, circulating a fluid cooling medium through the tubular parts heating the furnace face portion of said molded composition to such a high temperature as to oxidize parts of the said extensions and bond the composition thereto, and correlating said circulation and the heating to control the extent of the oxidation and bonding.

2. In a method of forming a wall of a furnace the normal operation of which does not involve temperatures high enough to thermally create chemically developed bonds between the refractory of the wall and its supporting metal, providing fluid cooled tubes and securing them in such position that they will be subject to the heat of the furnace, welding ferrous metal extensions to the tubes, processing a chemically neutral spinel refractory composition with a plasticizer and cementing agent to form a stiff plastic, molding said stiff plastic composition around the extensions and between the tubes to form an integrated furnace face, circulating a fluid cooling medium through the tubes, locally heating the applied refractory composition at temperatures and over time periods sufficient to develop thermally and chemically created mechanical bonds between the refractory and the metal extensions to form a thoroughly bonded monolithic wall, the temperature of such local heating being higher than the normal furnace temperatures during a subsequent operation of the furnace and the intensity and duration of the local heating being increased to chemically produce at the ends of the studs irregular bodies bonding the studs with the refractory, said irregular bodies including ferrous substances developed by the local application of the heat to the furnace face, and correlating the cooling and the heating to control the bonding.

3. The method of forming fluid cooled furnace walls which include stud tubes with refractory material over the furnace sides of the tubes and between the studs, said method including the assembly of the stud tubes in wall formation, the subsequent application of refractory material over the furnace faces of the tubes and between the studs, said application of the refractory material being effected in such a way that the ends of the ferrous metal studs are exposed to the interior of the furnace, the circulation of a cooling fluid through the tubes, the application of heat to the furnace side of the wall with an excess of air and the consequent oxidizing of the ends of the studs, the continued application of heat at a temperature sufficient to fuse the iron oxide and cause it to bond with the refractory material by extending into a matrix of that material in dendritic formation, and the correlation of said heating with the cooling effect of said circulation, the cooling of the refractory material by the circulation of fluid through the tubes during normal operation of the furnace solidifying some of the previously molten iron oxide in such dendritic bonding formations.

4. The method of forming a corrosion resistant wall for a furnace normally operating at temperatures below the fusion point of iron oxide, the method comprising the pressure molding or cementing of a stiff plastic chrome ore refractory and plasticizer mixture around and between spaced ferrous metal elements so that the refractory is packed tightly between these elements, leaving the ends of said elements exposed toward the interior of the furnace, subjecting the furnace face formed by the molded refractory and the exposed ends of said ferrous metal elements to the heating and drying action of combustion under oxidizing conditions to cause the formation of iron oxide at the ends of said elements, increasing the intensity of said combustion and thereby fusing the developed iron oxide and causing it to flow into cracks in the refractory and thus mechanically bond said elements and the refractory in an integral monolithic furnace wall, cooling the opposite ends of said ferrous elements by fluid circulation while said combustion is being effected, and correlating said cooling and heating to control the extent of the iron oxide fusion and consequently control the bonding, the furnace thereafter operating at temperatures normally below the fusion temperature of the bonding iron oxide.

5. In the art of building furnaces, the method which comprises the application of a chemically neutral refractory in a moldable condition to wall tubes having ferrous extensions thereon, causing a fluid cooling medium to be circulated through the tubes, and simultaneously applying heat to the furnace face of the refractory and causing a cooling medium to be circulated through the tubes to bond said ferrous extensions and the refractory, said bonding resulting at least in part from the development of iron oxide on the extensions and the subsequent fusing or sintering of the same with the refractory, the cooling effect of said medium and the heating being correlated to control the bonding and limit said fusing or sintering.

6. In the art of building furnaces, the method which comprises the molding of a chrome ore refractory composition to a row of studded tubes to combine with the ends of the studs to present a furnace face, the furnace ends of the studs being left uncovered in the disposition of the refractory, simultaneously heating the refractory and the stud ends and applying the cooling effect of a fluid circulation to the tubes and their studs to form a monolithic wall, the intensity of the heating being increased to produce irregular bodies at the furnace ends of the studs to bond the studs to the refractory, the bonding of said irregular bodies being limited by said cooling effect to positions near the outer ends of the studs.

7. In the art of building furnaces, the method which comprises the arranging of a plurality of ferrous metal extensions in good heat exchange relationship to a hollow ferrous structure adapted to contain a flowing cooling medium, installing a moldable chromite base refractory composition over said body and around the extensions, oxidizing the ferrous metal of the extensions by the application of heat to the furnace face of the refractory and thereby developing iron oxide between the refractory and the outer ends of extensions while cooling the tubes and the tube ends of the studs by circulating a cooling fluid through the tubes, and fusing the iron oxide at least a part of which is subsequently solidified to bond the extensions and the refractory.

ERVIN G. BAILEY.